United States Patent [19]

Summers

[11] Patent Number: 5,189,828
[45] Date of Patent: Mar. 2, 1993

[54] DOWNRIGGER FISHING SYSTEM

[76] Inventor: Jerald C. Summers, 204 S. County Rd. 3, Fort Collins, Colo. 80524

[21] Appl. No.: 816,605

[22] Filed: Dec. 31, 1991

[51] Int. Cl.⁵ .............................................. A01K 91/00
[52] U.S. Cl. .................................. 43/43.12; 43/43.1; 43/44.97
[58] Field of Search .................. 43/43.12, 27.2, 42.74, 43/43.1, 44.84, 44.97

[56] References Cited

U.S. PATENT DOCUMENTS

| 2,589,715 | 3/1952 | Lysikowski | 43/42.74 |
| 2,988,395 | 6/1961 | Rogers | 43/43.12 |
| 4,177,599 | 12/1979 | Pettersen | 43/43.12 |
| 4,314,420 | 2/1982 | Dickinson et al. | 43/44.97 |
| 4,467,550 | 8/1984 | Haulk | 43/43.12 |
| 4,813,172 | 3/1989 | McCue | 43/43.12 |
| 5,054,227 | 10/1991 | Lin | 43/43.12 |

Primary Examiner—Richard K. Seidel
Assistant Examiner—Chuck Y. Mah
Attorney, Agent, or Firm—Dean P. Edmundson

[57] ABSTRACT

A downrigger fishing system is described which significantly decreases the incidence of bottom snags. The downrigger system includes a downwardly and rearwardly extending leg which resists snagging or catching on rocks and other submerged items in the water. The downrigger system is useful for fishing at a desired depth by holding the line and lure under the water at any designated depth. The line is released from the downrigger when a fish takes the lure.

1 Claim, 2 Drawing Sheets

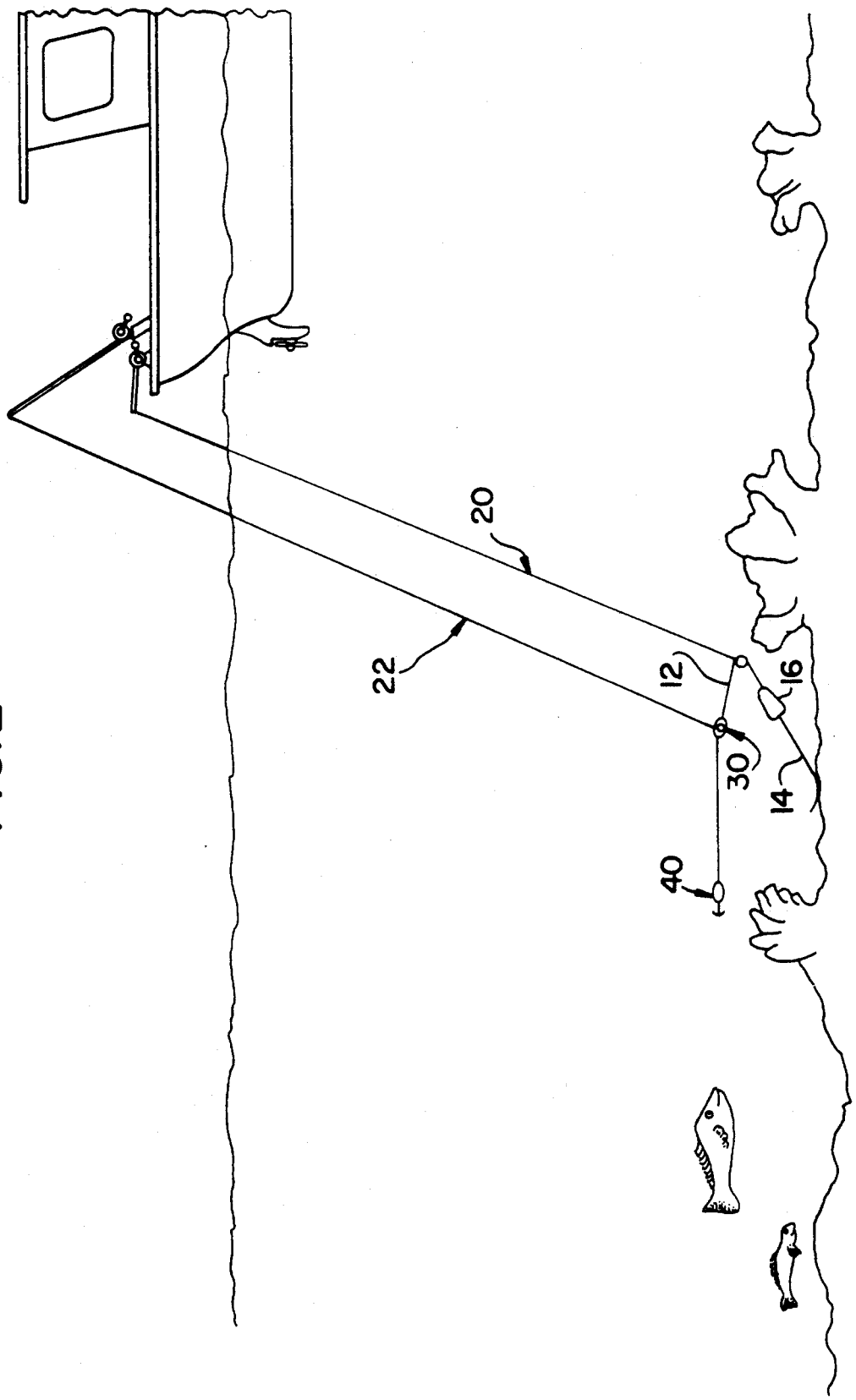

DOWNRIGGER FISHING SYSTEM

FIELD OF THE INVENTION

This invention relates to downrigger fishing techniques. More particularly, this invention relates to downrigger devices for holding a fishing line and lure under the water at a desired depth.

BACKGROUND OF THE INVENTION

The use of downriggers for fishing has been previously known. This involves a technique that enables a fishing lure to be trolled behind a boat at a desired depth under the water. This technique is desirable because it enables the person fishing to place the lure at the depth at which the fish may be located. For example, certain types of fish may be found at a depth of 30 feet and other types of fish may be found at a depth of 10 feet or 20 feet, etc.

Although people have tried to position lures in the water at a desired depth by permanently fastening weights to the line, this technique is not normally effective while trolling unless considerable weight is used. Also, the existence of permanent weights on the line interferes with the proper feel of the line when a fish takes the lure. The presence of weights on the line deadens the action for the fisherman. Accordingly, this technique is undesirable.

A conventional downrigger system involves a ball-shaped lead weight which is attached to a thin cable. The cable is wound around a drum or wheel portion of a winch apparatus secured to the edge of the boat. A quick release clip is attached to the rear of the lead weight, and the fishing line is inserted into the clip. The desired lure or bait is attached to the end of the line. After the line is clipped in place, the weight is lowered by the winch to the desired water depth in order to lower the line and lure to the desired depth.

The lure is trolled behind the boat at the desired depth because it is attached to the weight and cable. When a fish hits the lure, the pressure clip releases the line from the cable, leaving the fisherman free to pursue the catch without the interference of the downrigger apparatus.

Although use of the downrigger apparatus has certain advantages, there are also some disadvantages associated with such apparatus. Fish frequently stay near the bottom of lakes and oceans where there is an abundance of rocks and rough surfaces for protection. Consequently, when a downrigger ball is dragged over such surfaces and projecting objects, the ball frequently becomes lodged or caught in a position in which it is impossible to free the ball, thus resulting in lost time while trying to retrieve or loosen the ball. When this fails, it is necessary to cut the cable and leave the ball (and sometimes the lure and line). At that point, it is necessary to attach a new ball to the cable and start over again. This procedure is time-consuming, cumbersome, and expensive.

Although the downrigger weight may have a shape such as a fish or banana, it is still subject to becoming snagged or caught on obstructions under the water.

There has not heretofore been described a downrigger system having all of the advantages provided by the present invention.

SUMMARY OF THE INVENTION

In accordance with the present invention there is provided an improved downrigger system which significantly reduces or avoids the incidence of snagging or catching the downrigger on submerged objects during use. The downrigger is easy to use and exhibits all the advantages of the prior downrigger systems but is not plagued by the deficiencies of the prior systems.

Another advantage of the downrigger system is that the weight can be shaped and oriented such that the downrigger can be steered away from other downriggers being towed by the same boat. This helps to avoid entanglement of the cables used to tow the downriggers when the boat sharply changes directions.

Other advantages of the downrigger system of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which:

FIG. 2 illustrates use of the downrigger system of FIG. 1 when towed by a fishing boat.

DETAILED DESCRIPTION OF THE INVENTION

Figure 1:
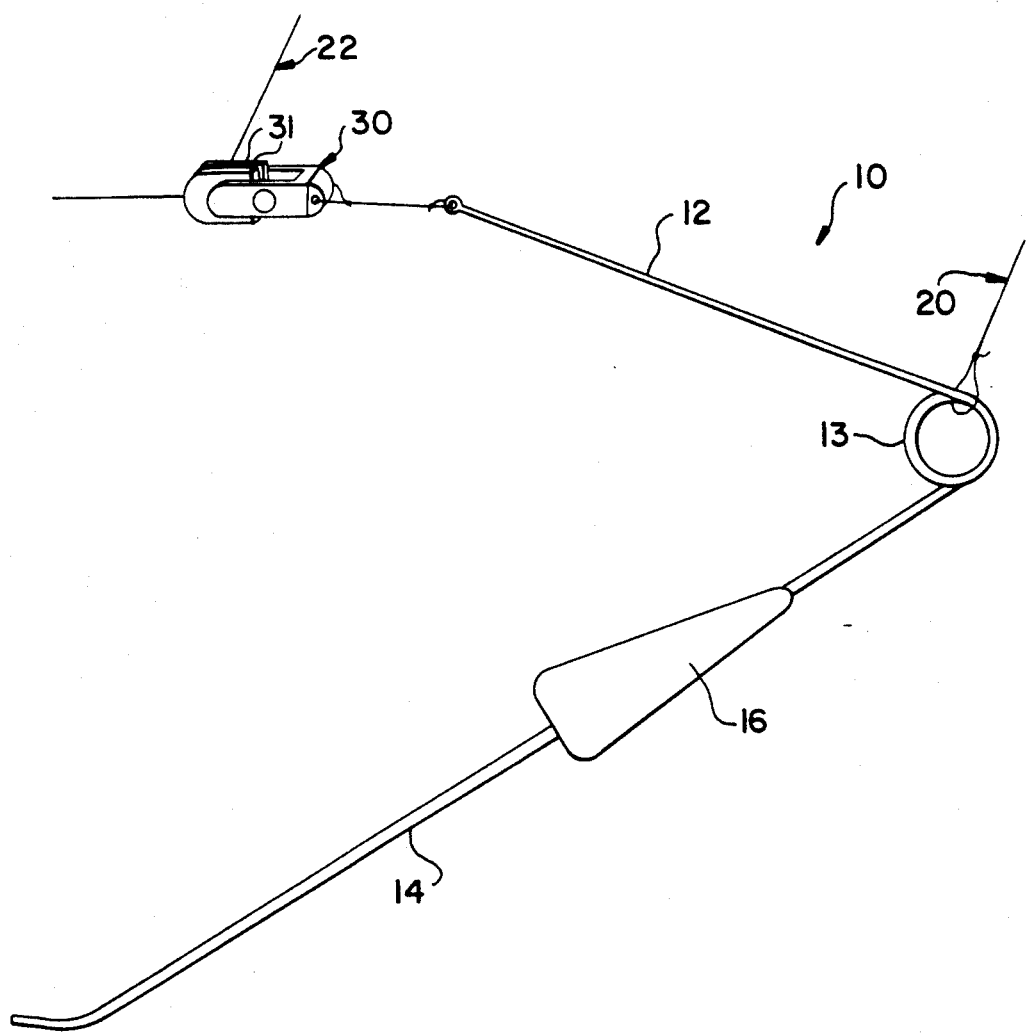
FIG. 1 is a side elevational view of a preferred embodiment of downrigger system of the invention.

In FIGS. 1 and 2 there is illustrated a downrigger system 10 of the invention comprising a generally V-shaped body member having an upwardly extending arm member 12 and a downwardly and rearwardly extending leg member 14. A weight member 16 is secured to the leg member.

The upper end of the leg is attached to the lower end of the arm member. Preferably the arm and leg members are integral and are joined by a coiled section 13. The coil provides an attachment point for the cable 20 which is used to tow the downrigger behind a boat while fishing. Also, the coil provides for spring action of the arm and leg members. The coil also provides more bounce when it strikes the bottom of the lake, for example, which in turn gives the fishing lure more action.

At the upper end of the arm member 12 there is attachment means for detachably securing the fishing line 22 to the arm. Many conventional line clips are suitable for use in securing the fishing line in this manner. The clip 30 shown in the drawings includes opposing fingers or jaws 31 between which the line 22 is frictionally retained. The jaws are urged toward each other by spring means. The clip is able to retain the line in the position shown until a fish takes the lure 40 at the end of the line. Then the force on the line is sufficient to overcome the frictional force exerted by the clip, and the line is pulled free of the clip. This enables the fisherman to control the fish without interference by the downrigger system.

The leg member 14 extends downwardly below the weight 16. Because the leg is thin and of uniform thickness, it is not subject to snagging rocks or submerged obstructions. Rather, the leg tends to ride along the bottom and lifts over rocks and obstructions as the downrigger is towed.

The weight 16 typically weighs about 5 to 12 pounds, with a weight 6–7 pounds being preferred. The shape of the weight may also vary. Preferably the weight has a generally triangular shape, with the apex facing forwardly, as illustrated. Other shapes, of course, could also be used.

The triangular shape shown for the weight is preferred because it exhibits less resistance than previous shapes when it is towed through the water. As a result, it is more directly under the boat during use and the depth meter on the downrigger is more accurate. The shape shown is designed to glide over obstructions such as moss beds.

Another advantage of the downrigger system of this invention is that the weight can be adjustably mounted on the leg 14, if desired. For example, the weight can be secured to the leg by means of a removable pin which engages the leg and extends through the weight. Providing more than one location on the leg for engaging the pin enables the weight to be located at different positions on the leg. Another possibility is the use of a set screw in the weight for engaging the leg at any desired position.

By providing for adjustable mounting of the weight on the leg, it is possible to rotate the weight axially on the leg. This enables one to obtain a planing effect so that the weight tends to travel to the left or to the right, as desired, of the direction of travel of the boat which is towing the downrigger. For this purpose, it is preferred that the weight be shaped such that it is capable of gliding smoothly through the water and, depending upon the orientation of the weight, it may be pushed either to the left or the right by the force of the water.

The leg member is preferably at least about 8 inches long and may be much longer, e.g., 30 inches or more, if desired. The arm member may have a length as short as about 6 inches or as long as 25 inches or more. For practical reasons the length of the arm is less than about 20 inches.

Preferably the length of the leg member below the lower end of the weight is about 15 to 20 inches. The length of the leg member between the upper end of the weight and the coil is about 4 to 6 inches. The angle between the arm 12 and leg 14 is preferably in the range of about 40° to 65°.

The arm and leg members may both be composed of the same material. A preferred diameter is about 5/32 to ¼ inch (e.g. 3/16 inch). Other diameter rods may also be used, desired, such as 0.1–0.5 inch. Although the presence of a coil connecting the arm and leg members is preferred, it is not required. The coil provides for enhanced spring action between the arm and leg members.

The arm and leg members are preferably composed of stainless steel which is corrosion-resistant and has very good tensile strength. Other materials could also be used, if desired.

Other variants are possible without departing from the scope of this invention. For example, other shapes for the weight may also be used.

What is claimed is:

1. A method for positioning a lure below the surface of water, wherein said lure is secured to a fishing line, wherein the method comprises the steps of:
   (a) providing a downrigger system comprising:
      (1) a generally V-shaped body member having an upwardly extending arm member and a downwardly and rearwardly extending leg member, wherein said arm member further includes attachment means for detachably securing said line thereto; wherein said body member comprises an elongated rod member;
      (2) a weight member secured to said leg member; wherein said weight member weights 5 to 12 pounds; and
   (b) connecting a towing line to said body member;
   (c) detachably connecting said fishing line to said arm member; and
   (d) towing said downrigger system below the water surface in a manner such that said arm member and said leg member are in a vertical plane.

* * * * *